United States Patent
Pore et al.

(10) Patent No.: US 10,431,201 B1
(45) Date of Patent: Oct. 1, 2019

(54) ANALYZING MESSAGES WITH TYPOGRAPHIC ERRORS DUE TO PHONEMIC SPELLINGS USING TEXT-TO-SPEECH AND SPEECH-TO-TEXT ALGORITHMS

(71) Applicant: International Business Machines Corporation, Armonk, NY (US)

(72) Inventors: Meenal Pore, Nairobi (KE); David Moinina Sengeh, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/925,888

(22) Filed: Mar. 20, 2018

(51) Int. Cl.
*G10L 13/08* (2013.01)
*G10L 15/26* (2006.01)
*G06F 17/27* (2006.01)

(52) U.S. Cl.
CPC .......... *G10L 13/086* (2013.01); *G06F 17/273* (2013.01); *G10L 15/26* (2013.01)

(58) Field of Classification Search
CPC ...... G10L 13/086; G10L 15/26; G06F 17/273
See application file for complete search history.

(56) References Cited

U.S. PATENT DOCUMENTS

| | | |
|---|---|---|
| 4,692,941 A | 9/1987 | Jacks et al. |
| 5,708,759 A | 1/1998 | Kemeny |
| 5,758,320 A | 5/1998 | Asano |
| 6,012,028 A | 1/2000 | Kubota et al. |
| 6,347,295 B1 | 2/2002 | Vitale et al. |
| 6,847,714 B2 | 1/2005 | Das et al. |
| 6,959,279 B1 | 10/2005 | Jackson et al. |
| 6,963,841 B2 | 11/2005 | Handal et al. |
| 7,589,646 B2 | 9/2009 | Glover |
| 8,554,862 B2 | 10/2013 | Stefani |
| 8,962,455 B2 | 2/2015 | Choi et al. |
| 9,265,460 B2 | 2/2016 | Boas et al. |
| 9,594,742 B2 * | 3/2017 | Yi .......................... G06F 17/277 |
| 9,845,769 B2 | 12/2017 | Hercock |
| 2006/0067508 A1 | 3/2006 | Basson et al. |
| 2007/0038455 A1 | 2/2007 | Murzina et al. |
| 2007/0287136 A1 | 12/2007 | Jenkins et al. |
| 2011/0111805 A1 | 5/2011 | Paquier et al. |

(Continued)

OTHER PUBLICATIONS

Kabra, S., "Auto Spell Suggestion for High Quality Speech Synthesis in Hindi", International Journal of Computer Applications, Feb. 2014, pp. 31-34, vol. 87, No. 17.

(Continued)

*Primary Examiner* — Sonia L Gay
(74) *Attorney, Agent, or Firm* — Scully, Scott, Murphy & Presser, P.C.

(57) ABSTRACT

Correcting typographical errors in electronic text may include converting a text message containing at least one phonemic spelling of a word into speech by running a text-to-speech application programming interface (API) with the text message as input. The converted speech may be input to a speech-to-text API and the speech-to-text API executed to convert the speech to text. A text file comprising the text may be generated and/or output. The text file automatically contains a corrected version of the phonemic spelling of the word in text message.

20 Claims, 5 Drawing Sheets

(56) References Cited

U.S. PATENT DOCUMENTS

2016/0179774 A1* 6/2016 McAteer ............... G06F 17/273
    704/9
2017/0309272 A1 10/2017 Vanreusel et al.

OTHER PUBLICATIONS

Gordon, W., "Use Android Voice-to-Text as an SMS Spell Checker", http://lifehacker.com/5634051/use-android-voice-to-text-as-an-sms-spell-checker, Sep. 10, 2010, 2 pages, Printed on Mar. 14, 2018.
"English Phonetic Transcription Translator", https://easypronunciation.com/en/english-phonetic-transcription-converter, Printed on Mar. 14, 2018, 9 pages.
"The Speech Accent Archive", http://accent.gmu.edu/, Last updated Mar. 12, 2018, Printed on Mar. 14, 2018, 1 page.

* cited by examiner

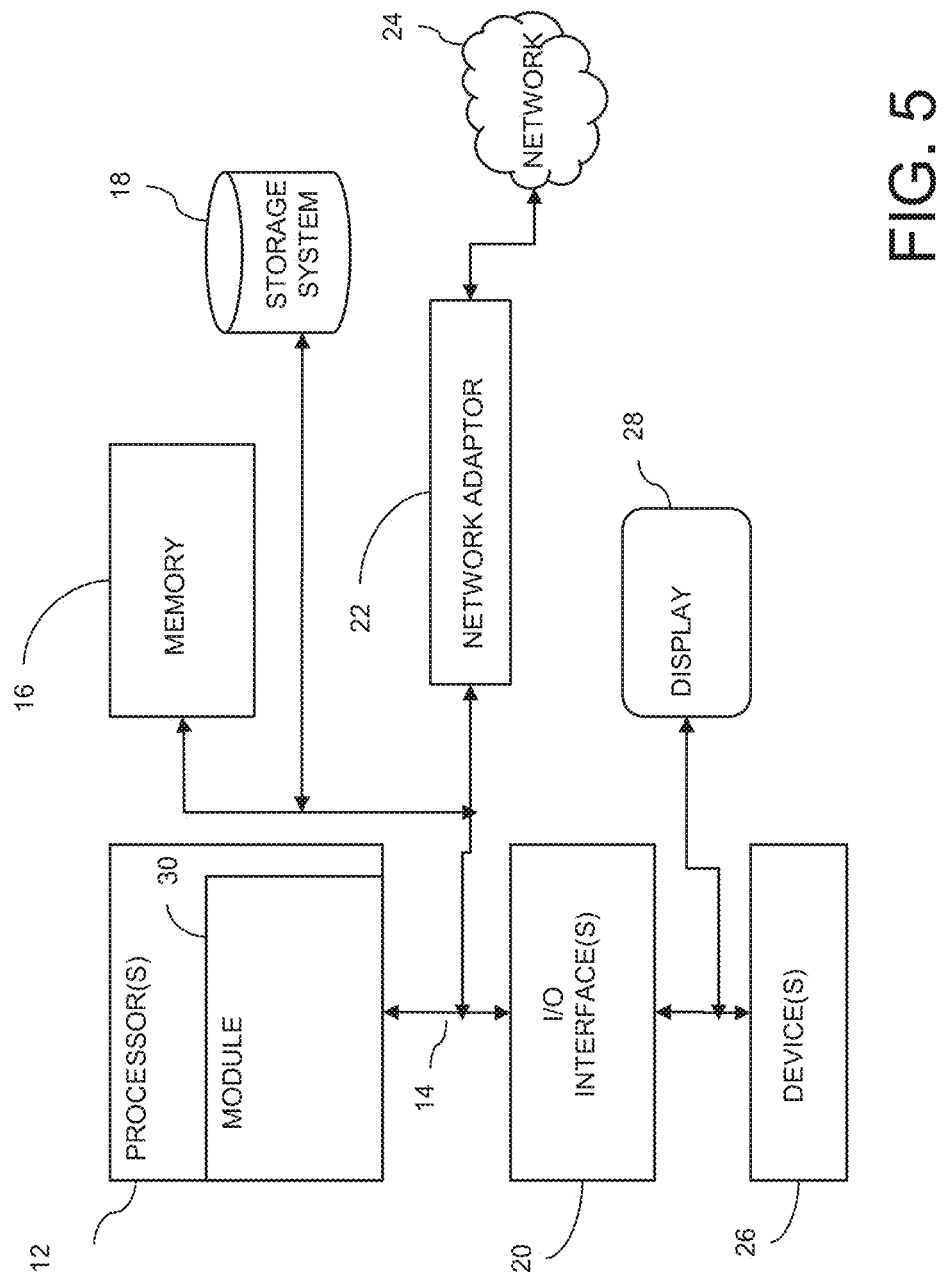

ANALYZING MESSAGES WITH TYPOGRAPHIC ERRORS DUE TO PHONEMIC SPELLINGS USING TEXT-TO-SPEECH AND SPEECH-TO-TEXT ALGORITHMS

FIELD

The present application relates generally to computers and computer applications, and more particularly to computer-implemented natural language processing, text-to-speech and speech-to-text recognitions, detecting and correcting typographic errors in messages using text-to-speech and speech-to-text recognition algorithms.

BACKGROUND

Languages have phonemic orthography where the graphemes (the characters used to write the language) correspond directly to phonemes (spoken sounds). Some languages have a high degree of phonemic orthography more than others. English language, on the other hand, is considered to have irregular mapping of graphemes to phonemes.

Still there are instances in which English is written using phoneme to grapheme mapping. For instance, people with a phonemic language as their mother tongue may write in English using the same mapping of graphemes to phonemes as they would use in their mother tongue. As another example, texts or messages or the like used in social media applications and like applications on the Internet are increasingly presented with phonemic spelling (e.g., spelled the way the word sounds, is pronounced or voiced), for instance, to shorten the time taken to type messages. An example of an English word with irregular grapheme to phoneme mapping is the word "night", which may appear written as "nite."

Standard English language processing services, such as Unstructured Information Management Architecture (UIMA) from International Business Machines Corporation (IBM®), The Natural Language Toolkit (NLTK) and AlchemyAPI from IBM®, may have difficulty in processing such messages or text, since many of the phonemic words would be considered erroneous, and would not map to words in the English language.

BRIEF SUMMARY

A computer-implemented method and system of correcting typographical errors in electronic text may be provided. The method, in one aspect, may include receiving a text message containing at least one phonemic spelling of a word. The method may also include converting the text message into speech by running a text-to-speech application programming interface (API) with the text message as input. The method may further include generating an audio file comprising the speech. The method may also include playing the audio file as an input to a speech-to-text API and executing the speech-to-text API to convert the speech to a text corresponding to the played audio file. The method may further include generating a text file comprising the text corresponding to the played audio file. The text corresponding to the played audio file automatically may contain a corrected version of the phonemic spelling of the word in the received text message.

A system of correcting typographical errors in electronic text, in one aspect, may include at least one hardware processor and a memory device coupled with the at least one hardware processor, The at least one hardware processor may be operable to at least: receive a text message containing at least one phonemic spelling of a word, convert the text message into speech by running a text-to-speech application programming interface (API) with the text message as input, generate an audio file comprising the speech, play the audio file as an input to a speech-to-text API and execute the speech-to-text API to convert the speech to a text corresponding to the played audio file, generate a text file comprising the text corresponding to the played audio file. The text corresponding to the played audio file may automatically contain a corrected version of the phonemic spelling of the word in the received text message.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 5 illustrates a schematic of an example computer or processing system that may implement a system in one embodiment of the present disclosure.

DETAILED DESCRIPTION

System, method and/or techniques are disclosed, which improves automatically language processing applications or services to automatically correct typographic errors in written text, for example, in English, for example, in cases where the text contains incorrectly spelled words due to the text being written by direct phonemes to graphemes mapping.

Using text-to-speech and speech-to-text recognition algorithms sequentially can help in reducing typographical errors in text, for example, particularly in text written in English by mapping phonemes to graphemes. The first (L1) language of the person writing the message may also affect a) their pronunciation of English words, and hence the grapheme to phoneme mapping that they are likely to use when writing English, and b) in some cases, an originating region of their language is likely to affect the grapheme to phoneme mapping.

Typographic errors due to phonemic spellings can be corrected by identifying and utilizing appropriate text-to-speech and then speech-to-text algorithms. If a word is unknown in the language in which the text-to-speech code is being run, most algorithms default to reading that word phonemically. In the audio file, the word now sounds the same as a known word in the given language. When the word is converted back to text using speech-to-text, it is transcribed with the correct spelling, and can be put through further natural language processing (NLP) systems to extract higher level features from the message such as key topic, sentiment, and other features to confirm or verify the spelling. Identifying the likely L1 language of the author, or the origin of a language, the system can be optimized by choosing the most suitable accent for text-to-speech and speech-to-text application programming interfaces (APIs) manually or automatically.

A methodology disclosed herein may be useful in cases where non-native English speaker may be entering transcribed text in English, for example, using phonemes, which text is input to a language processing service for an automatic language processing. For example, phone calls may be transcribed by a call operator and entered into a mobile app, which saves the data to a cloud-hosted database (DB). Being able to automatically correct such transcribed messages would allow for better use of those data streams by automated systems such as automatic cataloging or categorizing systems that can trigger automatic follow up actions. As other examples, the methodology of the present disclosure may be useful in services such as chatbots that interpret messages and interact with users, computer-implemented language interpreters or processors that review comments sections, surveys, and review sites.

Figure 1:
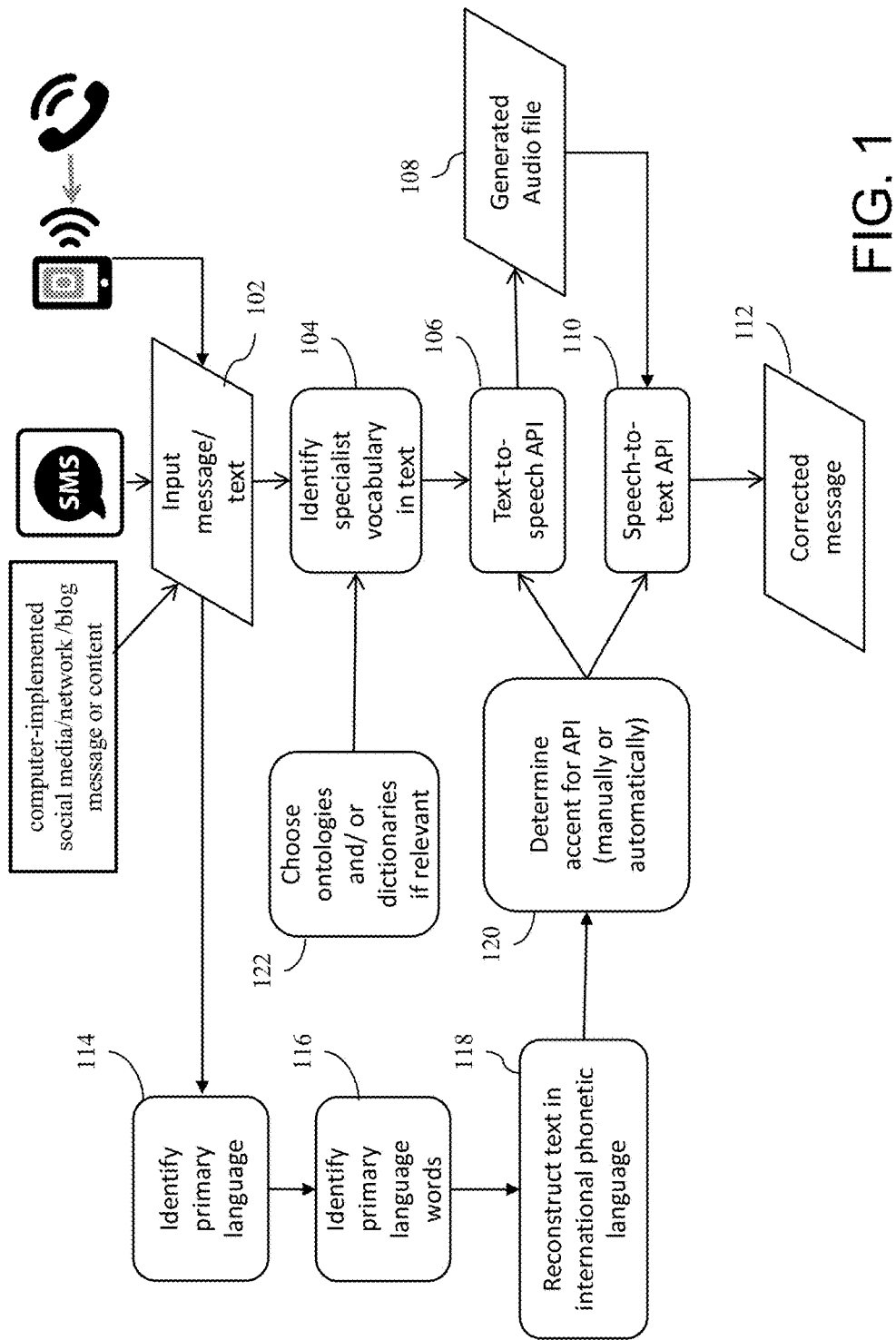
FIG. 1 is a diagram illustrating a logic flow of a method of analyzing messages with typographic errors in one embodiment.

FIG. 1 is a diagram illustrating a logic flow of a method of analyzing messages with typographic errors in one embodiment. The method, for example, may be executed on or by at least one hardware processor such as a central processing unit (CPU) couple with a memory device, and/or another hardware processor. At 102, input message or text or like is received. For instance, the input message or text may be received via a messaging application, a social network application, or the like. As another example, the input message may be received from a user such as a call center agent transcribing a spoken message to text. Yet another example may include use as an on-device spellchecker for users, including for example, non-native English writers who use phonemic spellings when writing in English.

At 104, a specialist vocabulary in the text may be identified. A specialist vocabulary refers to entity names, places, medical terms, and the like. Such vocabulary may be identified utilizing a predefined ontology or a dictionary 122 or the like. The predefined ontology or dictionary 122 may be stored on a storage device and accessed by the hardware processing executing the method. Such vocabulary may be identified and removed from the text. The identified specialist vocabulary may be used in identifying the context around the text and inform an automated API selection process for the text-to-speech and speech-to-text. For example, if it is clear that the entity names within the text are from a specific geographic region, an API associated with that specific geographic region may be selected or chosen.

The text with or without the specialist vocabulary may be input to a text-to-speech API and at 106, the text-to-speech API is executed, which generates an audio file 108 comprising the text converted into speech. An example of such API may include, but is not limited to, Watson™ text-to-speech APIs from International Business Machines Corporation (IBM)® and Amazon Polly from Amazon™, Seattle Wash. Other applications or APIs, for example, capable of synthesizing text into speech, for example, natural-sounding speech into languages, dialects, and/or voices, may be employed.

At 110, the generated audio file 108 is input to a speech-to-text API, which generates a text based on the input audio file. An example of such API may include, but is not limited to, Watson™ speech-to-text APIs from International Business Machines Corporation (IBM)®. Other speech recognition applications or APIs may be employed. The generated text 112 corrects typographic errors, for example, caused by phoneme to grapheme mapping in the input text.

In one aspect, the text-to-speech API and the speech-to-text API that are run at 106 and 110 respectively, may be selected, for example, based on an originator or author of the input text. In one aspect, an API for text-to-speech and an API for speech-to-text may be selected. In another aspect, an API that may incorporate both the text-to-speech and speech-to-text may be selected. For instance, at 114, primary language of the originator may be identified. The primary language, for example, may be identified by running a machine trained model such as a convolutional network. As another example, the primary language may be determined or identified from meta data, e.g., Internet Protocol (IP) address from where the text is sent. In yet another example, the primary language may be selected manually.

At 116, words belonging to a special vocabulary in the language are removed. Examples of special vocabulary include, but are not limited to, place names and words stored in subject-specific ontology databases, e.g., medical terms. These words are removed or stripped so that they are not present in the training data of a model that selects or classifies the text-to-speech API. Since many special words, e.g., medical terms, are not spelled phonemically, these words would be incorrectly transcribed when passed through text-to-speech and speech-to-text APIs sequentially.

At 118, the remaining text is used to reconstruct the text in international phonetic language. For instance, once the primary language is identified, an International Phonetic Alphabet (IPA) translator is executed or run. The IPA translator converts the text of the identified primary language to IPA phonetic transcription.

At 120, an accent for selecting an API may be determined. In one aspect, this step may be performed manually. For instance, based on the location of origination of the text, an administrator may input the type of accent, for instance, British accent versus American accent. Misspellings and correct spellings are both accent based, e.g., United Kingdom (UK)/United States (US) English spellings of centre/center versus other regional spellings such as "senta" and "sena" for the same word. The grapheme to phoneme mapping varies with different accents. As a result, writers who use phonemic spellings may use different graphemes to express the same word in English, depending on the accents the writers may use. Using the speech-to-text and text-to-speech APIs that are built to recognize particular accents would improve the accuracy of the conversion of the texts to include the correct spelling.

In another aspect, accent determination at 120 may be performed automatically. For instance, an optimal accent may be determined by recording audio files of reading samples of the text and conducting similarity analysis to identify the most similar accent for which there is a text-to-speech (TTS) and speech-to-text API available. The similarity analysis may be conducted using an audio file recorded for the local geography and those generated by passing or inputting the same reading sample through the text-to-speech (TTS) API for each of the accents available. The audio files may be audio samples collected or those from standardized datasets. One of the inputs to the TTS APIs may be an accent that should be used, e.g., British English, US English, Irish English, or another. The same text may be used to generate a set of audio files with different accents. If a writer has written, for example, text using US English phonemes, the generated audio file would be expected to more closely match the US English audio samples in a reference database, which may store different speech accents (e.g., http://accent.gmu.edu/). For example, if the writer meant to write 'centre' but used the US phonemic spelling of 'sena', a British English TTS API may create an audio signal that sounds like 'sen-aah', while the US English TTS API would create an audio signal that sounds like 'sen-ah'. As a result, the audio signal produced would more closely match US English samples in the reference database than British English samples. In one embodiment, a learned or trained model such as a convolutional neural network, which automatically self-learns to detect a corresponding accent given a speech audio, may be run to automatically determine the APIs. Furthermore, the context, which may be identified through the specialist vocabulary 122, may all inform the choice of an optimal API at 120.

Text-to-speech APIs for different accents are available, which convert text into speech with a designated accent, for example plays an audio stream corresponding to the text. A text-to-speech API that can recognize a particular accent corresponding to a geographic location may further improve the accuracy of the text-to-speech conversion. Similarly, a speech-to-text API that can recognize a particular accent corresponding to a geographic location may further improve the accuracy of converting to output text, the speech that has been converted from the input text. Based on the determined accent, an appropriate API may be selected for text-to-speech conversion at 106, and also for speech-to-text conversion at 106.

Figure 2:
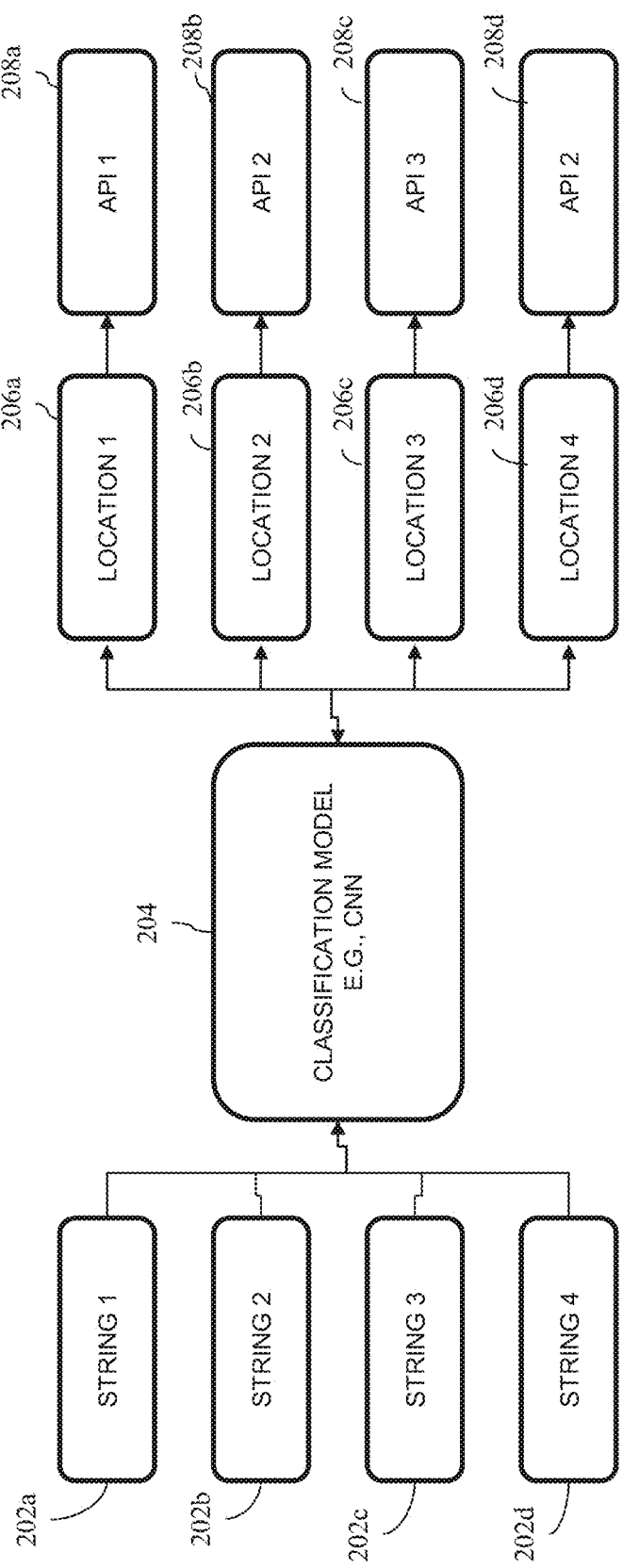
FIG. 2 is a diagram illustrating a selecting of a text-to-speech application programming interface (API) based on input string in one embodiment.

FIG. 2 is a diagram illustrating a selecting of a text-to-speech application programming interface (API) based on input string in one embodiment. In one aspect, the selection of an API may be performed by running a trained classification model 204, for example, trained by running a machine learning algorithm. An example of a machine learning algorithm may include a convolutional neural network (CNN) algorithm, in which a convolutional neural network (CNN) is trained to output or classify a geographic location (e.g., one of 206a, 206b, 206c, 206d) corresponding to a language or accent of the input string (e.g., one of 202a, 202b, 202c, 202d). An input string may include text in international phonetic alphabet. Based on a geographic location (e.g., one of 206a, 206b, 206c, 206d) classified as output by the classification model 204, an API (e.g., one of 208a, 208b, 208c, 208d) may be selected. For example, an API may be looked up that is associated with the location. A lookup dictionary or table or the like, may have been created previously that maps locations to APIs. In another aspect, an API may have metadata or attribute that specifies its associated location, and an API having an attribute that specifies the location may be selected.

In one aspect, a convolutional neural network (CNN) or another machine learning model that uses supervised learning, may be trained by inputting a number of labeled training data set comprising input strings with different locality accents (e.g., input strings in international phonetic alphabet) and output locations. A model may be trained on text strings from writing samples from different locations. Using the labeled training data set, the convolutional neural network learns the weights of the network that minimizes the prediction error in correctly classifying an input string by location. The weights and biases of the CNN may be learnt from the training data. An activation function such as the softmax function may be used in the final layer of this neural network-based classifier. For instance, the final softmax layer may be trained to have n classes, where n is the number of accents to be classified. The final softmax layer may, therefore, output an n×1 vector of normalized scores for each accent. Hyperparameters used in training the CNN may be configurable. In running the trained CNN, the Top-1 classification (highest score) may be used to determine which accent (geographic location using that accent) should be selected for the TTS API.

In one aspect, a different model is trained for each primary language. The primary language refers to base language being used in the message or text, The primary language determines the language of the IPA translation since the phonetic mappings of languages vary, e.g., English 'cordial'→kɔ : dɪə l, but French 'cordial'→'kɔ : ʳdɪə l.

Figure 3:
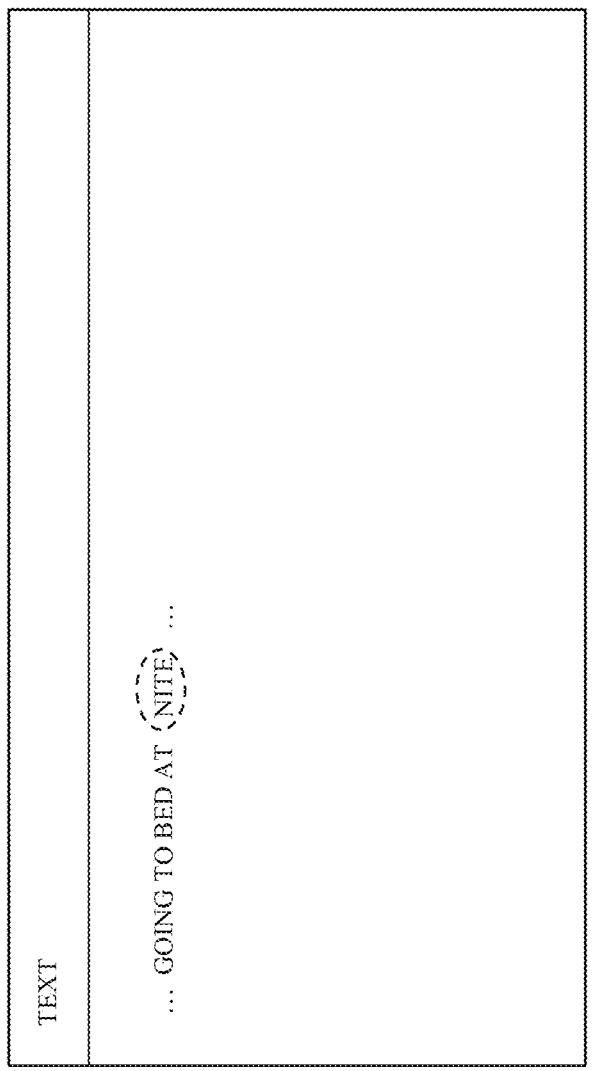
FIG. 3 is an example user interface display showing an input text having a typographic error due to a phonetic spelling of a word in one embodiment.

FIG. 3 is an example user interface display showing an input text having a typographic error due to a phonetic spelling of a word. For instance, the word "night" is spelled phonetically as "nite." Running a chosen text-to-speech API to convert the text into voice or speech and read back the text creates an audio file. Running a chosen speech-to-text API that converts the speech in the audio file to written text corrects the spelling of "nite" to "night."

Figure 4:
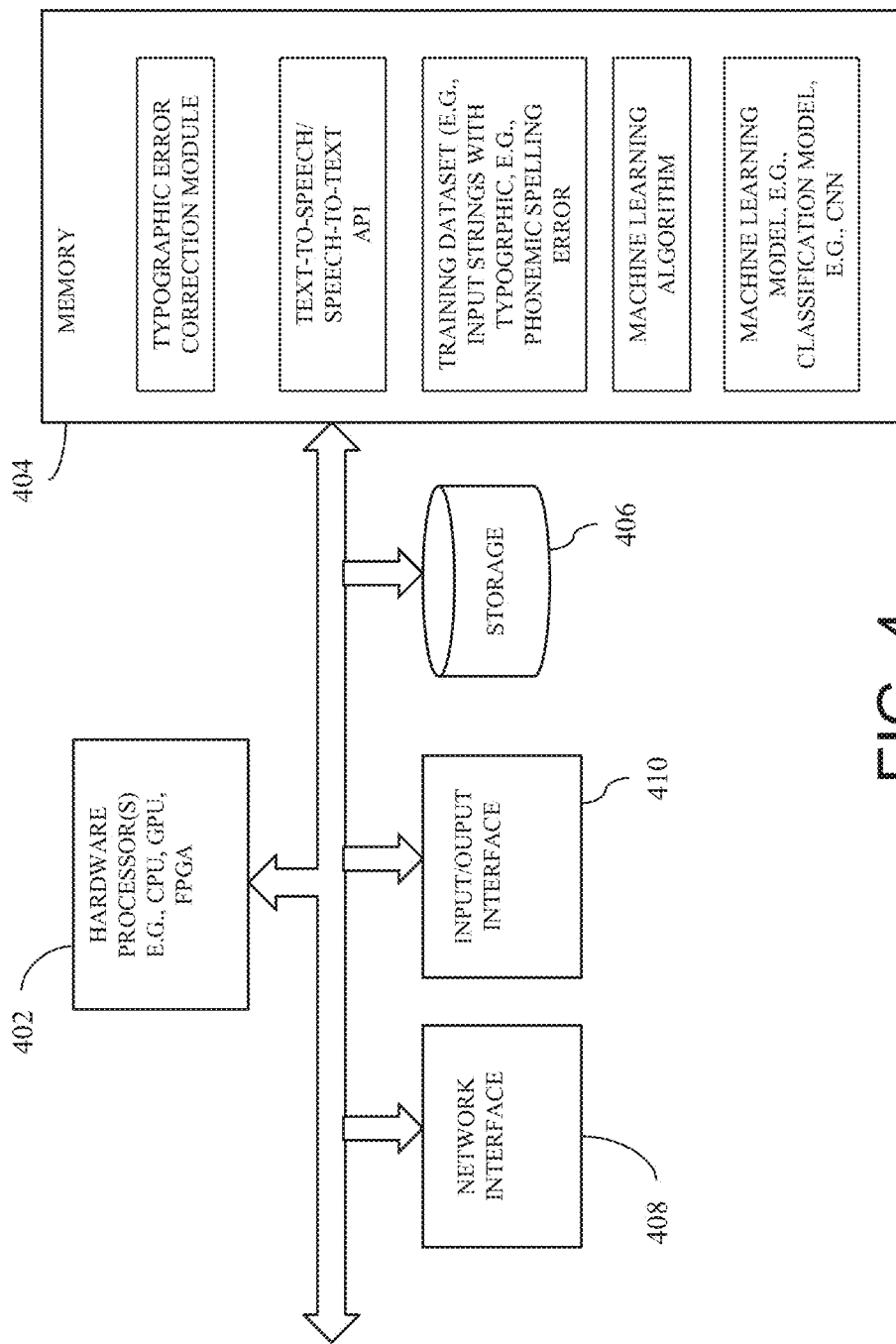
FIG. 4 is a diagram illustrating components of a system of analyzing messages with typographic errors in one embodiment.

FIG. 4 is a diagram illustrating components of a system of analyzing messages with typographic errors in one embodiment. One or more hardware processors 402 such as a central processing unit (CPU), a graphic process unit (GPU), and/or a Field Programmable Gate Array (FPGA), and/or another processor, may be coupled with a memory device 404, and run or execute correcting of one or more typographic errors in electronic text. The memory device 404 may, for example, store instructions and/or data for functioning of the one or more hardware processors 402, and may include an operating system and other program of instructions and/or data. The memory device 404, for instance, may store at one or more time execution time points, a program instructions for correcting a typographic error, for instance, as disclosed herein, for instance, text-to-speech and speech-to-text APIs, a machine learning algorithm and/or a machine learning model. The memory device 404 at least at one time point, may also store a training data set for training the machine learning model. In another aspect, the training data set may be stored in a persistent storage device 406 coupled with one or more hardware processors 402. The one or more hardware processors 402 may be also coupled with interface devices such as a network interface 408 for communicating with remote systems, for example, via a network, and an input/output interface 410 for communicating with input and/or output devices such as a keyboard, mouse, display, and/or others.

At least one hardware processor 402 may receive a text message containing at least one phonemic spelling of a word, and convert the text message into speech by running or executing a text-to-speech API with the text message as input. In one aspect, the text-to-speech API may be received or executed from a remote computer such as a cloud-based or server-based computer via the network interface 408. Phonemic spelling of a word refers to a word that is spelled incorrectly, but spelled based on its pronunciation or phoneme. Based on different accents, there may be a number of different phonemic spellings for a given word. A hardware processor 402 may generate an audio file comprising the speech and play the audio file as an input to a speech-to-text API to convert the speech to a text corresponding to the played audio file. For instance, the speech output by the text-to-speech API may be input to a speech-to-text API, and the speech-to-text API executed to generate text corresponding to the input speech. In this way, the text corresponding to the played audio file automatically contains a corrected version of the phonemic spelling of the word in the received text message.

In one aspect, a hardware processor 402 may remove special vocabulary from the text message prior to inputting the text message into the text-to-speech API.

In one aspect, a hardware processor 402 may select the text-to-speech API based on a language accent detected in the text message. In one aspect, this selecting may be performed based on running an automatic machine learned model that classifies an input text into a location. A text-to-speech API is selected that maps to the classified location. For instance, users of English language in different geographic locations may have different accents or pronunciations, and therefore, may write an English word based on phonemes particular to the geographic location. A text-to-speech API that can recognize the particular location's accents may provide more accurate conversion of the text into English speech.

In one aspect, a hardware processor 402 may select the speech-to-text API based on a language accent detected in the text message. In one aspect, this selecting may be performed based on running an automatic machine learned model that classifies an input text into a location. A speech-to-text API is selected that maps to the classified location. For instance, users of English language in different geographic locations may have different accents or pronunciations, and therefore, may pronounce or voice an English word based on phonemes particular to the geographic location. A speech-to-text API that can recognize the particular location's accents or pronunciation of words may provide for a more accurate conversion of speech into text.

A hardware processor 402 may also receive a training data set that includes input strings in international phonemic alphabet and corresponding locations. A hardware processor 402 may train a machine learning model by running a machine learning algorithm with the training data set, to classify the location. An example of a machine learning model is a convolutional neural network.

In another aspect, a hardware processor 402 may select the text-to-speech API based on context of the text message. In another aspect, a hardware processor 402 may select the speech-to-text API based on context of the text message.

The following example shows an execution flow of a method in one embodiment with an example input original message including meta data:

Original message: ' . . . so that peeple in bo will go to bed at nite with nyc sleep'
[metadata: sentfrom{Sierra Leone}]
The method, for example, identifies the primary language to be English. The method also identifies words from the primary language so that they can be converted to IPA using standardized mappings. Unknown words may be converted using default IPA mappings, e.g.: ' . . . sə ʊ ðæt peeple in bə ʊ wil gə ʊ to: bed æt nait wið nyc sli: p'. The method converts the IPA translation to speech using IPA phonemes and saves the audio file to memory, e.g., a memory device. The audio file may be saved in the format of a speech-synthesis-markup-language or another like audio format. The audio file may be passed through a categorization model (e.g., neural network classification model) to determine the closest accent. In another aspect, the accent may be chosen manually. Using the chosen accent, and knowledge of the primary language, the method selects a text-to-speech (TTS) and speech-to-text (STT) API, e.g., selects British English APIs in this example. The method may identify any special vocabulary appearing in the original message, e.g., based on meta data of message, e.g., place names such as Bo in Sierra Leone in this example. The spellings of these special vocabulary words are not corrected using TSS-STT APIs in one embodiment. The method may run the original text through TTS and STT APIs to correct spellings, resulting in the corrected message: ' . . . so that people in bo will go to bed at night with nice sleep'.

FIG. 5 illustrates a schematic of an example computer or processing system that may implement a system of analyzing messages with typographic errors in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others.

Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method of correcting typographical errors in electronic text, the method executed by at least one hardware processor, the method comprising:
    receiving a text message containing at least one phonemic spelling of a word;
    converting the text message into speech by running a text-to-speech application programming interface (API) with the text message as input;
    generating an audio file comprising at least the speech;
    playing the audio file as an input to a speech-to-text API and executing the speech-to-text API to convert the speech to a text corresponding to the played audio file; and
    generating a text file comprising at least the text corresponding to the played audio file,
    wherein the text corresponding to the played audio file automatically contains a corrected version of the phonemic spelling of the word in the received text message.

2. The method of claim 1, further comprising removing special vocabulary from the text message prior to inputting the text message into the text-to-speech API.

3. The method of claim 1, further comprising selecting the text-to-speech API based on a language accent detected in the text message.

4. The method of claim 3, wherein the selecting of the text-to-speech API based on a language accent detected in the text message comprises at least inputting the text message to a machine learning model to classify the text message into a geographic location and selecting the text-to-speech API that is mapped to the geographic location.

5. The method of claim 1, further comprising selecting the speech-to-text API based on a language accent detected in the text message.

6. The method of claim 5, wherein the selecting of speech-to-text API based on a language accent detected in the text message comprises at least inputting the text message to a machine learning model to classify the text message into a geographic location and selecting the text-to-speech API that is mapped to the geographic location.

7. The method of claim 1, further comprising training a machine learning model with a training data set comprising at least input strings in international phonemic alphabet and mapped locations, the machine learning model trained to classify geographic locations given an input string comprising at least a phonetically spelled word.

8. The method of claim 7, wherein the machine learning model comprises at least a convolutional neural network.

9. The method of claim 1, further comprising selecting the text-to-speech API based on context of the text message.

10. The method of claim 1, further comprising selecting the speech-to-text API based on context of the text message.

11. A system of correcting typographical errors in electronic text, comprising:
    at least one hardware processor;
    a memory device coupled with the at least one hardware processor;
    the at least one hardware processor operable to at least:
        receive a text message containing at least one phonemic spelling of a word;
        convert the text message into speech by running a text-to-speech application programming interface (API) with the text message as input;
        generate an audio file comprising at least the speech;
        play the audio file as an input to a speech-to-text API and execute the speech-to-text API to convert the speech to a text corresponding to the played audio file; and
        generate a text file comprising at least the text corresponding to the played audio file,
    wherein the text corresponding to the played audio file automatically contains a corrected version of the phonemic spelling of the word in the received text message.

12. The system of claim 11, wherein the at least one hardware processor is further operable to remove special vocabulary from the text message prior to inputting the text message into the text-to-speech API.

13. The system of claim 11, wherein the at least one hardware processor is further operable to select the text-to-speech API based on a language accent detected in the text message.

14. The system of claim 13, wherein the at least one hardware processor selecting the text-to-speech API based on a language accent detected in the text message comprises at least inputting the text message to a machine learning model to classify the text message into a geographic location and selecting the text-to-speech API that is mapped to the geographic location.

15. The system of claim 11, wherein the at least one hardware processor is operable to select the speech-to-text API based on a language accent detected in the text message.

16. The system of claim 15, wherein the at least one hardware processor selecting speech-to-text API based on a language accent detected in the text message comprises at least inputting the text message to a machine learning model to classify the text message into a geographic location and selecting the text-to-speech API that is mapped to the geographic location.

17. The system of claim 11, wherein the at least one hardware processor is further operable to receive a training data set comprising at least input strings in international phonemic alphabet and corresponding locations, and train a machine learning model by running a machine learning algorithm with the training data set, to classify geographic locations given an input string comprising at least a phonetically spelled word.

18. The system of claim 17, wherein the machine learning model comprises at least a convolutional neural network.

19. A computer program product for correcting typographical errors in electronic text, the computer program product comprising a computer readable storage medium having program instructions embodied therewith, wherein the computer readable storage medium is not a transitory signal per se, the program instructions readable by a processor to cause the processor to perform a method comprising:

receiving a text message containing at least one phonemic spelling of a word;

converting the text message into speech by running a text-to-speech application programming interface (API) with the text message as input;

generating an audio file comprising at least the speech;

playing the audio file as an input to a speech-to-text API and executing the speech-to-text API to convert the speech to a text corresponding to the played audio file; and generating a text file comprising at least the text corresponding to the played audio file, wherein the text corresponding to the played audio file automatically contains a corrected version of the phonemic spelling of the word in the received text message.

20. The computer program product of claim 19, wherein the method further comprises selecting the text-to-speech API and the speech-to-text API based on a language accent detected in the text message.

* * * * *